US012654606B2

(12) United States Patent
Tatematsu et al.

(10) Patent No.: US 12,654,606 B2
(45) Date of Patent: Jun. 16, 2026

(54) CUSHION FRAME FOR VEHICLE SEAT

(71) Applicant: TOYOTA BOSHOKU KABUSHIKI KAISHA, Aichi (JP)

(72) Inventors: Ryoya Tatematsu, Nisshin (JP); Sho Terada, Nagoya (JP); Shunsuke Tanaka, Toyota (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 119 days.

(21) Appl. No.: 18/748,219

(22) Filed: Jun. 20, 2024

(65) Prior Publication Data

US 2025/0001922 A1 Jan. 2, 2025

(30) Foreign Application Priority Data

Jun. 28, 2023 (JP) ................................. 2023-105843

(51) Int. Cl.
B60N 2/68 (2006.01)
B60N 2/02 (2006.01)

(52) U.S. Cl.
CPC .............. B60N 2/682 (2013.01); B60N 2/02 (2013.01)

(58) Field of Classification Search
CPC . B60N 2/02; B60N 2/68; B60N 2/682; B60N 2/3038; B60N 2/304
See application file for complete search history.

(56) References Cited

U.S. PATENT DOCUMENTS

| | | | | | |
|---|---|---|---|---|---|
| 6,155,639 | A * | 12/2000 | Frolo | ..................... | B60N 2/305 |
| | | | | | 297/331 |
| 6,293,603 | B1 * | 9/2001 | Waku | ................... | B60N 2/3072 |
| | | | | | 296/65.09 |
| 6,676,216 | B1 * | 1/2004 | Freijy | ................... | B60N 2/309 |
| | | | | | 296/65.09 |
| 7,828,358 | B2 * | 11/2010 | Mitsuhashi | ............ | B60N 2/309 |
| | | | | | 296/65.05 |
| 8,590,970 | B2 * | 11/2013 | Takakura | ............. | B60N 2/0818 |
| | | | | | 297/331 |
| 8,833,853 | B2 * | 9/2014 | Kim | ..................... | B60N 2/2362 |
| | | | | | 297/316 |
| 9,522,616 | B2 * | 12/2016 | Kaneda | .................. | B60N 2/366 |
| 10,173,556 | B2 * | 1/2019 | Imayou | ................... | B60N 2/06 |
| 10,822,091 | B2 * | 11/2020 | Erhel | ................. | B60N 2/42736 |
| 12,145,732 | B2 * | 11/2024 | Selvarajan | ......... | B64D 11/0648 |
| 12,187,174 | B2 * | 1/2025 | Mansouri | ............... | B60N 2/682 |
| 2013/0001999 | A1 * | 1/2013 | Sasaki | .................. | B60N 2/3063 |
| | | | | | 297/378.1 |
| 2024/0059194 | A1 * | 2/2024 | Reinhardt | ............ | B60N 2/0881 |

FOREIGN PATENT DOCUMENTS

JP 2009-051233 A 3/2009

* cited by examiner

*Primary Examiner* — Philip F Gabler
(74) *Attorney, Agent, or Firm* — Greenblum & Bernstein, P.L.C.

(57) ABSTRACT

In a cushion frame, a bracket body, to which a hinge is fixed, is welded and fixed to a bridge frame, which couples a front frame and an intermediate frame to each other, and to a second frame. This results in a configuration in which the front frame, the intermediate frame, the bridge frame, and the second frame form a frame-shaped structure and in which the bracket body is fixed to at least the bridge frame and the second frame.

6 Claims, 4 Drawing Sheets

CUSHION FRAME FOR VEHICLE SEAT

CROSS-REFERENCE TO RELATED APPLICATIONS

This application claims the benefit of Japanese Patent Application No. 2023-105843 filed on Jun. 28, 2023 with the Japan Patent Office, the entire disclosure of which is incorporated herein by reference.

BACKGROUND

The present disclosure relates to a cushion frame for a vehicle seat in which a front end portion of a seat cushion is coupled to a vehicle via a hinge.

In a so-called "vehicle seat with a tumble function", a front end portion of a seat cushion is coupled to a vehicle via a hinge as described in Japanese Unexamined Patent Application Publication No. 2009-51233 (hereinafter referred to as Patent Document 1), for example. The "tumble function" refers to a function that, with a seatback folded forward to be flat, provides a state in which the seat cushion is rotated to spring up forward about its front end portion (see FIG. 1 of Patent Document 1).

SUMMARY

When a large forward force acts on a vehicle seat, a large load is applied to a hinge and a bracket to which the hinge is fixed. Nevertheless, in the invention described in Patent Document 1, the bracket is fixed to only a front pipe of a cushion frame (see FIG. 2 of Patent Document 1).

In view of the aforementioned point, the present disclosure discloses examples of a cushion frame for a vehicle seat, which can increase rigidity of a portion including a hinge and a bracket to which the hinge is fixed, as compared to the configuration described in Patent Document 1.

It is desirable that a cushion frame for a vehicle seat in which a front end portion of a seat cushion is coupled to a vehicle via a hinge comprises at least one of the elements below, for example.

Specifically, such elements are: a first frame arranged on one end side in seat-width directions, the first frame extending in seat front-rear directions; a second frame arranged on an other end side in the seat-width directions, the second frame extending in the seat front-rear directions; a front frame extending in the seat-width directions and coupling a front end of the first frame and a front end of the second frame to each other; an intermediate frame extending in the seat-width directions and coupling the first frame and the second frame to each other, the intermediate frame being arranged rearward of the front frame; a bridge frame extending in the seat front-rear directions so as to bridge the front frame and the intermediate frame, the bridge frame coupling the front frame and the intermediate frame to each other; and a bracket body to which the hinge is to be fixed, the bracket body being fixed at least to the bridge frame and the second frame.

This provides the cushion frame for a vehicle seat (hereinafter described as the "cushion frame") with a configuration in which the front frame, the intermediate frame, the bridge frame, and the second frame form a frame-shaped structure and in which the bracket body is fixed to at least the bridge frame and the second frame. Thus, rigidity of a portion including the hinge and the bracket body can be increased as compared to the configuration described in Patent Document 1.

In addition, the cushion frame may be configured as described below, for example.

Specifically, it is desirable that the cushion frame comprises an arched portion fixed to the second frame on a fore side and a rear side of the intermediate frame, and the arched portion is integral with the bracket body. With this configuration, the rigidity of the portion including the hinge and the bracket body can be further increased in the cushion frame.

It is desirable that one end of the bridge frame in its extending directions is welded to a first coupling frame, which is either one of the front frame and the intermediate frame, to hold the first coupling frame from an upper side and a lower side of the first coupling frame, and an other end of the bridge frame in its extending directions is welded to a second coupling frame, which is an other one of the front frame and the intermediate frame, on one side of the second coupling frame in up-down directions of the second coupling frame. This configuration can increase the degree of freedom in welding operations of the cushion frame.

It is desirable that the intermediate frame penetrates the second frame and extends in the seat-width directions, and the cushion frame further comprises a third frame to which a leading-end side portion of the intermediate frame in its extending directions is fixed, the third frame extending from the leading-end side portion of the intermediate frame toward a seat rear side; and a reinforcing portion welded to a part of the intermediate frame between the second frame and the third frame, the reinforcing portion being integral with the bracket body.

With this configuration, rigidity of the part of the intermediate frame between the second frame and the third frame can be increased in the cushion frame.

In addition, it is desirable that the bracket body, the arched portion, and the reinforcing portion form an integrated article formed of a single sheet of steel in the cushion frame.

BRIEF DESCRIPTION OF THE DRAWINGS

An example embodiment of the present disclosure will be described hereinafter with reference to the accompanying drawings, in which.

DETAILED DESCRIPTION OF EXEMPLARY EMBODIMENTS

Figure 1:
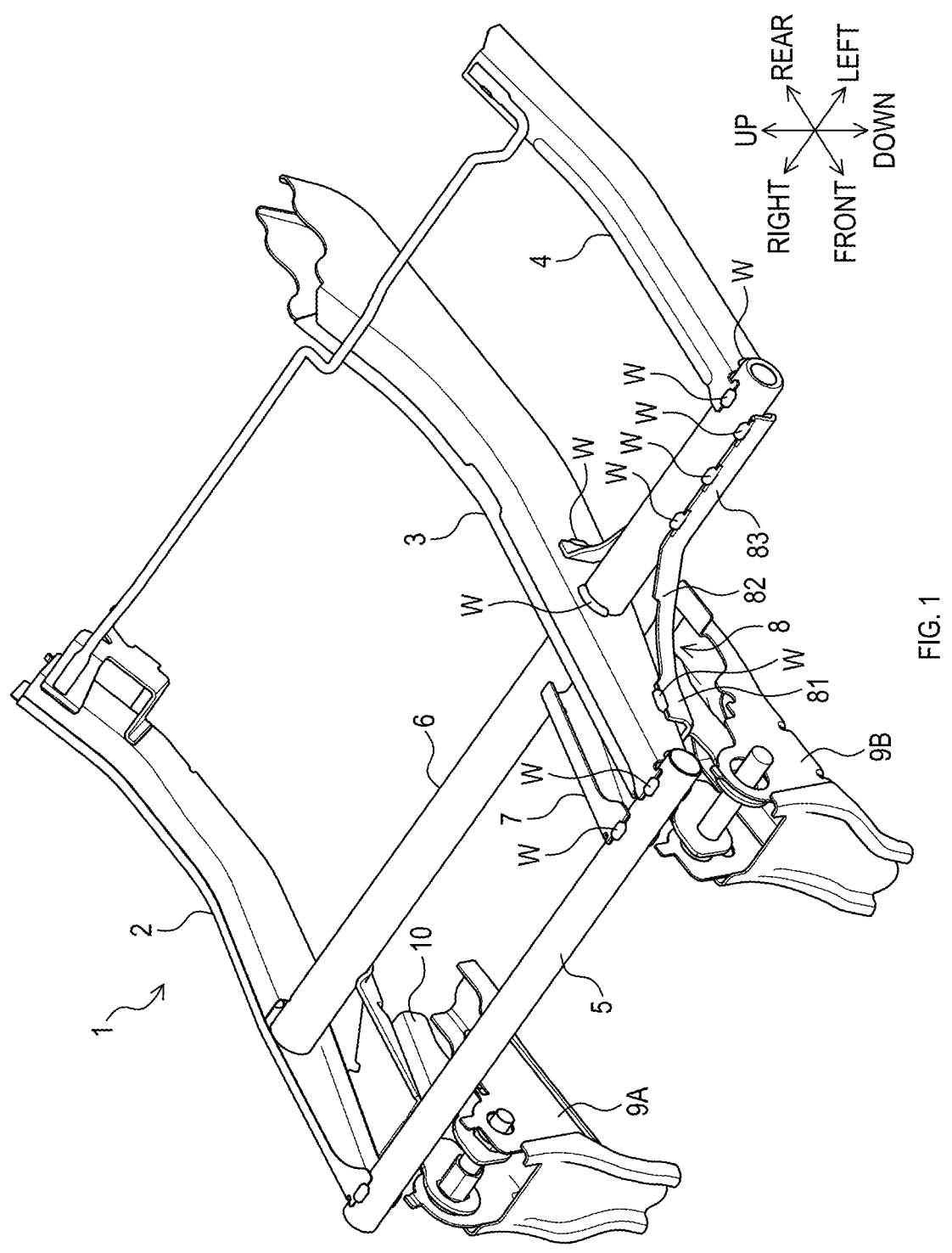
FIG. 1 is a diagram showing a cushion frame of a first embodiment.

Embodiments of the invention below show examples of embodiments that fall within the technical scope of the present disclosure. Specifically, matters specifying the invention and so on recited in the claims are not limited by any specific configuration, structure, and so on shown in the embodiments below.

The embodiments below are examples in which a cushion frame for a vehicle seat according to the present disclosure (hereinafter referred to as a "cushion frame") is applied to a seat to be mounted in a vehicle such as an automobile (hereinafter referred to as a "vehicle seat"). Arrows indicating the directions, hatched lines, and so on shown in the figures are provided to facilitate understanding of mutual relationships between the figures, shapes of members or portions, and so on.

Thus, the cushion frame is not limited by the directions shown in the figures. The directions shown in the figures are the directions in a state in which the vehicle seat according to each of the embodiments below is mounted in the automobile. A figure with hatched lines does not necessarily represent a sectional view.

With respect to a member or portion explained at least with a reference numeral, at least one such member or portion is provided unless it is specified using a term such as "only one". Specifically, unless it is specified using a term such as "only one", two or more such members or portions may be provided. The cushion frame shown in the present disclosure includes at least one of an element such as the member or portion explained at least with a reference numeral, or a structural component shown in the figures.

First Embodiment

1. Overview of Cushion Frame

A cushion frame 1 shown in FIG. 1 forms a framework of a seat cushion. The seat cushion is a portion for supporting buttocks of an occupant. A seatback (not shown) is coupled to a rear end of the cushion frame 1.

The cushion frame 1 comprises at least a first frame 2, a second frame 3, a third frame 4, a front frame 5, an intermediate frame 6, a bridge frame 7, a first hinge bracket 10, and a second hinge bracket 8.

The first frame 2, the second frame 3, and the third frame 4 are strengthening members extending in seat front-rear directions. These frames 2 through 4 are arranged in the following order: the first frame 2, the second frame 3, and the third frame 4 from one end side in seat-width directions (corresponding to a right end side in the present embodiment) to the other end side in the seat-width directions (corresponding to a left end side in the present embodiment).

The front frame 5 is a strengthening member extending in the seat-width directions and couples a front end of the first frame 2 and a front end of the second frame 3 to each other. In the present embodiment, the front frame 5 is coupled to the first frame 2 and to the second frame 3 by welding.

The intermediate frame 6 is a member that extends in the seat-width directions to couple the first frame 2 and the second frame 3 to each other, and is arranged rearward of the front frame 5. The intermediate frame 6 according to the present embodiment penetrates the second frame 3 and extends to the other end side in the seat-width directions.

A front end of the third frame 4 is fixed to a leading-end side portion of the intermediate frame 6 in its extending-directions (corresponding to a left end side of the intermediate frame 6 in the present embodiment). The third frame 4 extends from the portion of the intermediate frame 6 on the left end side toward a seat rear side.

Figure 2:
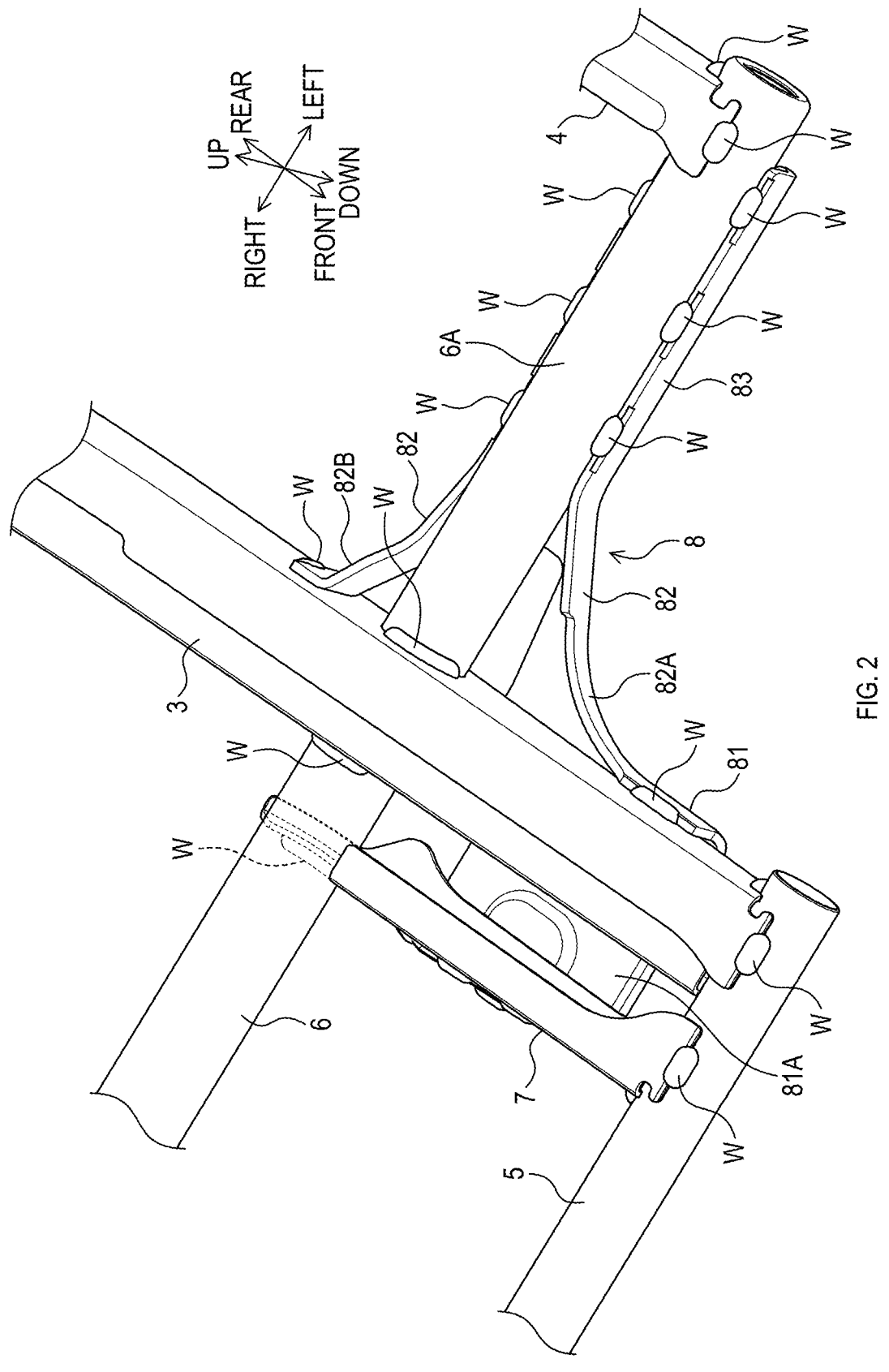
FIG. 2 is a diagram showing the cushion frame of the first embodiment.

As shown in FIG. 2, the bridge frame 7 is a member that extends in the seat front-rear directions so as to bridge the front frame 5 and the intermediate frame 6, whereby bridge frame 7 couples the front frame 5 and the intermediate frame 6 to each other.

Figure 3:
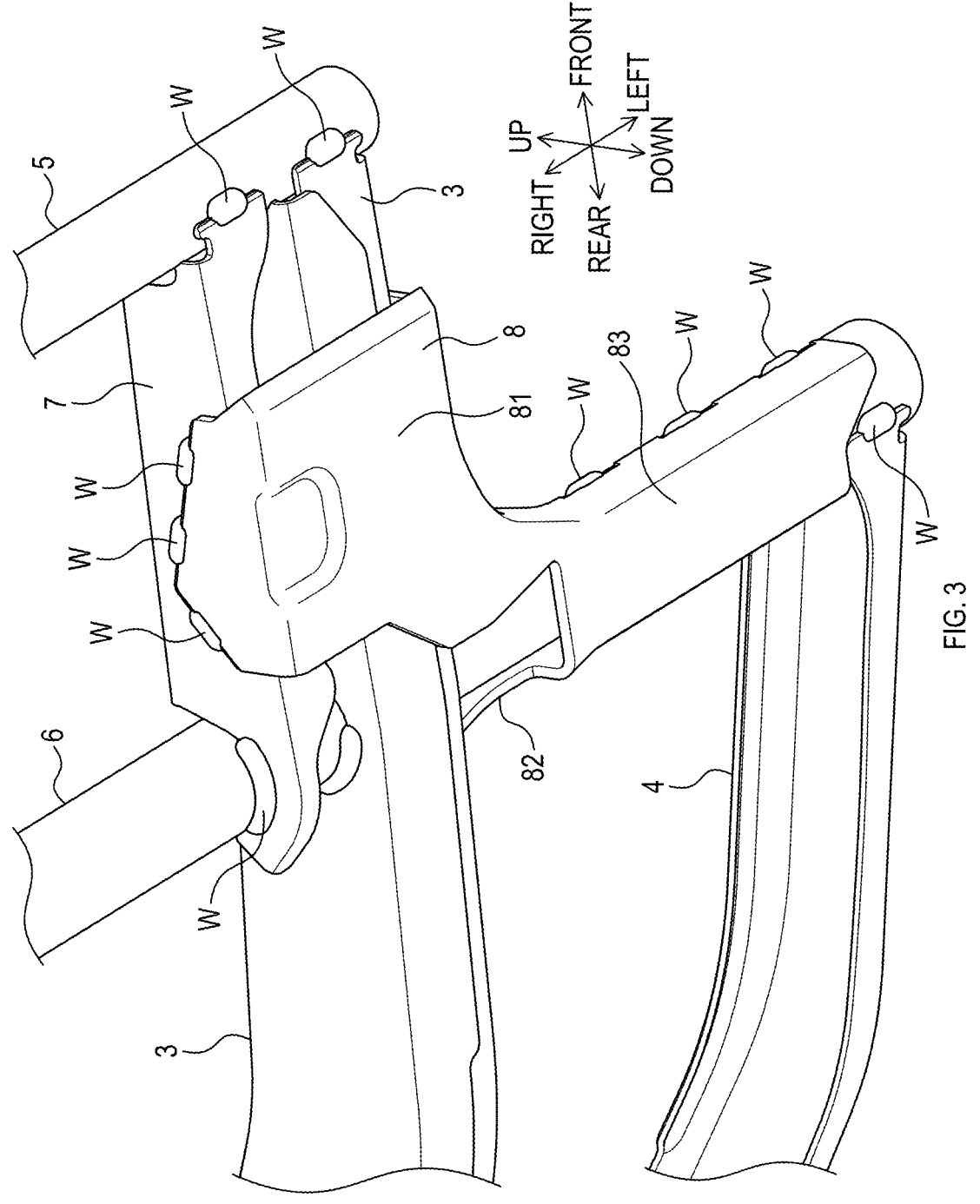
FIG. 3 is a diagram showing the cushion frame of the first embodiment.

As shown in FIGS. 2 and 3, one end of the bridge frame 7 in its extending directions (corresponding to a front end of the bridge frame 7 in the present embodiment) is welded to the front frame 5, which is shaped in a round-pipe, to hold the front frame 5 from an upper side and a lower side of the front frame 5.

The other end of the bridge frame 7 in its extending directions (corresponding to a rear end of the bridge frame 7 in the present embodiment) is welded to the intermediate frame 6, which is shaped in a round-pipe, on one side of the intermediate frame 6 in up-down directions of the intermediate frame 6 (corresponding to a lower side of the intermediate frame 6 in the present embodiment). Referential signs "W" in the figures such as FIGS. 2 and 3 represent weld beads.

As shown in FIG. 1, the first hinge bracket 10 and the second hinge bracket 8 are members to which a hinge 9A and a hinge 9B are fixed, respectively. Specifically, the first hinge bracket 10 is a member for coupling a first frame 2 side of the cushion frame 1 and the hinge 9A to each other.

The second hinge bracket 8 is a member for coupling a second frame 3 side of the cushion frame 1 and the hinge 9B to each other. The hinges 9A, 9B are members coupling a front end portion of the cushion frame 1 to the vehicle so that the front end portion of the cushion frame 1 is pivotable with respect to the vehicle.

As shown in FIGS. 2 and 3, the second hinge bracket 8 is fixed to at least the bridge frame 7 and the second frame 3. The second hinge bracket 8 according to the present embodiment is fixed to the bridge frame 7 and the second frame 3 by welding.

2. Details of Second Hinge Bracket

Figure 4:
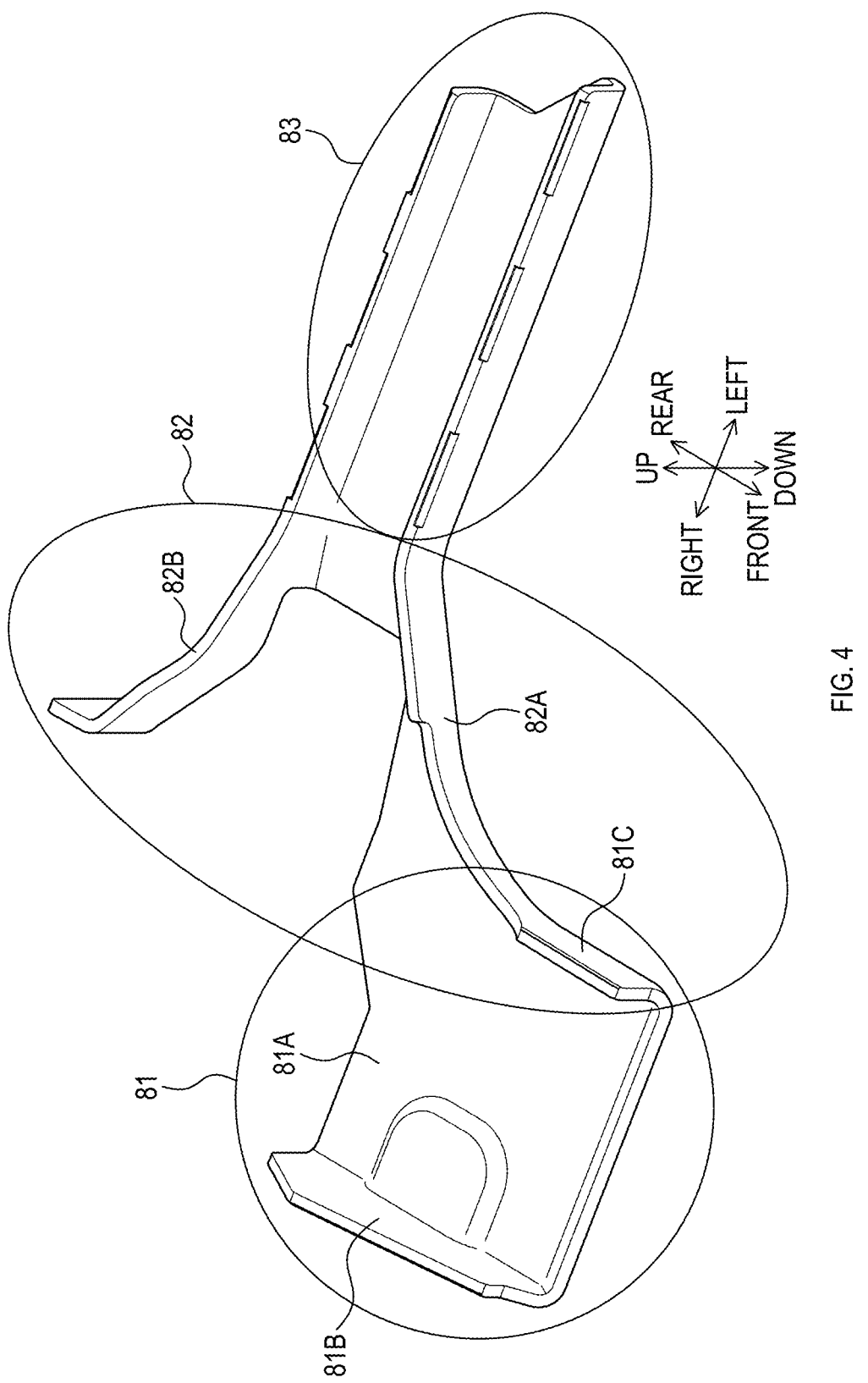
FIG. 4 is a diagram showing a second hinge bracket of the first embodiment.

As shown in FIG. 4, the second hinge bracket 8 comprises a bracket body 81, an arched portion 82, and a reinforcing portion 83. The second hinge bracket 8 according to the present embodiment is an integral article including the bracket body 81, the arched portion 82, and the reinforcing portion 83 formed from a single sheet of steel by pressing.

Bracket Body

The bracket body 81 is fixed (by welding, in the present embodiment) to the bridge frame 7 and the second frame 3, and comprises a fixing portion 81A. The fixing portion 81A is a portion to which the hinge 9B is fixed (with a bolt, in the present embodiment).

Welded walls 81B, 81C are respectively provided on one end side and the other end side of the fixing portion 81A in the seat-width directions. The welded wall 81B is welded onto the bridge frame 7 from the one end side in the seat-width directions (corresponding to the right end side in the present embodiment). The welded wall 81C is welded onto the second frame 3 from the other end side in the seat-width directions (corresponding to the left end side in the present embodiment).

Arched Portion

As shown in FIG. 2, the arched portion 82 is a portion fixed to the second frame 3 on a fore side and a rear side of the intermediate frame 6. Specifically, a part 82A of the arched portion 82 is welded to the second frame 3 on the fore side of the intermediate frame 6, and a part 82B of the arched portion 82 is welded to the second frame 3 on the rear side of the intermediate frame 6. In the present embodiment, as shown in FIG. 4, the part 82A is integral with the fixing portion 81A and the welded wall 81B.

Reinforcing Portion

As shown in FIG. 2, the reinforcing portion 83 is welded to a part 6A of the intermediate frame 6, the part 6A being a part between the second frame 3 and the third frame 4. The reinforcing portion 83 according to the present embodiment is welded to the part 6A to contact the part 6A from a front side and a rear side of the part 6A and to hold the part 6A from a seat front side and the seat rear side.

3. Characteristics of Cushion Frame of Present Embodiment

In the cushion frame 1 according to the present embodiment, as shown in FIG. 2, the bracket body 81, to which the hinge 9B is to be fixed, is welded and fixed to the bridge frame 7, which couples the front frame 5 and the intermediate frame 6 to each other, and to the second frame 3.

Thus, the cushion frame 1 has a configuration in which the front frame 5, the intermediate frame 6, the bridge frame 7, and the second frame 3 form a frame-shaped structure and in which the bracket body 81 is fixed to at least the bridge frame 7 and the second frame 3. This makes it possible to increase rigidity of a portion including the hinge 9B and the bracket body 81, as compared to the configuration described in Patent Document 1.

The cushion frame 1 comprises the arched portion 82 that is fixed to the second frame 3 on the fore side and the rear side of the intermediate frame 6, and the arched portion 82 is integral with the bracket body 81. With this configuration, rigidity of the portion including the hinge 9B and the bracket body 81 can be further increased in the cushion frame 1.

The front end of the bridge frame 7 is welded to the front frame 5 to hold the front frame 5 from the upper side and the lower side of the front frame 5, and the rear end of the bridge frame 7 is welded to the intermediate frame 6 on the lower side of the intermediate frame 6. This configuration can increase the degree of freedom in welding operations of the cushion frame.

The cushion frame 1 comprises the reinforcing portion 83 welded to the part 6A of the intermediate frame 6, and the reinforcing portion 83 is integral with the bracket body 81. With this configuration, rigidity of a part of the intermediate frame 6 between the second frame 3 and the third frame 4 can be increased in the cushion frame 1.

OTHER EMBODIMENTS

The aforementioned embodiment has (1) "a configuration in which the front end of the bridge frame 7 is welded to the front frame 5 to hold the front frame 5 from the upper side and the lower side of the front frame 5, and the rear end of the bridge frame 7 is welded to the intermediate frame 6 on the lower side of the intermediate frame 6".

However, the present disclosure is not limited thereto. Specifically, the present disclosure may have any one of the following configurations (2) through (4), for example:

(2) "a configuration in which the rear end of the bridge frame 7 is welded to the intermediate frame 6 to hold the intermediate frame 6 from an upper side and the lower side of the intermediate frame 6, and the front end of the bridge frame 7 is welded to the front frame 5 on the lower side of the front frame 5";

(3) "a configuration in which the rear end of the bridge frame 7 is welded to the intermediate frame 6 to hold the intermediate frame 6 from the upper side and the lower side of the intermediate frame 6, and the front end of the bridge frame 7 is welded to the front frame 5 on the upper side of the front frame 5"; or (4) "a configuration in which the front end of the bridge frame 7 is welded to the front frame 5 to hold the front frame 5 from the upper side and the lower side of the front frame 5, and the rear end of the bridge frame 7 is welded to the intermediate frame 6 on the upper side of the intermediate frame 6".

The second hinge bracket 8 according to the aforementioned embodiment is an integral article including the bracket body 81, the arched portion 82, and the reinforcing portion 83 formed from a single sheet of steel by pressing. However, the present disclosure is not limited thereto. Specifically, the present disclosure may have a configuration where at least one of the arched portion 82 or the reinforcing portion 83 has been eliminated, for example.

The cushion frame 1 according to the aforementioned embodiment comprises the third frame 4. However, the present disclosure is not limited thereto. Specifically, the present disclosure may include a cushion frame in which the third frame 4 has been eliminated, for example. In such a configuration, the part 6A is unnecessary.

The intermediate frame 6 according to the aforementioned embodiment penetrates the second frame 3 and extends to the other end side in the seat-width directions. However, the present disclosure is not limited thereto. Specifically, in the present disclosure, the part 6A may be a member different from the intermediate frame 6, for example.

In the aforementioned embodiments, the vehicle seat according to the present disclosure is applied to an automobile. However, application of the invention disclosed in the present specification is not limited to this. Specifically, for example, the present disclosure may also be applied to a seat used in vehicles such as railroad vehicles, ships and boats, and aircraft, and to a stationary seat used in theaters, at home, or other places.

Moreover, the present disclosure only needs to be consistent with the gist of the disclosure described in the above-described embodiments, and is not limited to the above-described embodiments. Therefore, a configuration may be employed in which at least two embodiments among the above-described embodiments are combined together or in which any of the elements shown in the drawings or the elements described with reference numerals in the above-described embodiments is omitted.

What is claimed is:

1. A cushion frame for a vehicle seat in which a front end portion of a seat cushion is coupled to a vehicle via a hinge, the cushion frame comprising:

a first frame arranged on one end side in a seat-width direction, the first frame extending in a seat front-rear direction;

a second frame arranged on an other end side in the seat-width direction, the second frame extending in the seat front-rear direction;

a front frame extending in the seat-width direction and coupling a front end of the first frame and a front end of the second frame to each other;

an intermediate frame extending in the seat-width direction and coupling the first frame and the second frame to each other, the intermediate frame being arranged rearward of the front frame;

a bridge frame extending in the seat front-rear direction so as to bridge the front frame and the intermediate frame, the bridge frame coupling the front frame and the intermediate frame to each other; and a bracket body to which the hinge is to be fixed, the bracket body being directly fixed at least to the bridge frame and the second frame.

2. The cushion frame for a vehicle seat according to claim 1, the bracket body further comprising:

an arched portion fixed to the second frame, the arched portion being fixed to the second frame on a fore side and a rear side of the intermediate frame.

3. The cushion frame for a vehicle seat according to claim 2, wherein one end of the bridge frame in its extending direction is welded to a first coupling frame, which is either one of the front frame and the intermediate frame, to hold the first coupling frame from an upper side and a lower side of the first coupling frame, and wherein an other end of the bridge frame in its extending direction is welded to a second coupling frame, which is an other one of the front frame and the intermediate frame, on one side of the second coupling frame in an up-down direction of the second coupling frame.

4. The cushion frame for a vehicle seat according to claim 3, wherein the intermediate frame penetrates the second frame and extends in the seat-width direction and, wherein the cushion frame for a vehicle seat further comprises:

a third frame to which a leading-end side portion of the intermediate frame in its extending-direction is fixed, the third frame extending from the leading-end side portion of the intermediate frame toward a seat rear side; and a reinforcing portion welded to a part of the intermediate frame between the second frame and the third frame, the reinforcing portion being integral with the bracket body.

5. The cushion frame for a vehicle seat according to claim 4, wherein the bracket body, the arched portion, and the reinforcing portion form an integral article formed of a single sheet of steel.

6. The cushion frame for a vehicle seat according to claim 1, wherein the seat cushion is operable to pivot up forwardly about the front end portion thereof via the hinge from a seat cushion usage position to a seat cushion storage position.

* * * * *